United States Patent
Rowland

(10) Patent No.: US 7,805,762 B2
(45) Date of Patent: Sep. 28, 2010

(54) METHOD AND SYSTEM FOR REDUCING THE FALSE ALARM RATE OF NETWORK INTRUSION DETECTION SYSTEMS

(75) Inventor: Craig H. Rowland, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1301 days.

(21) Appl. No.: 10/685,726

(22) Filed: Oct. 15, 2003

(65) Prior Publication Data

US 2005/0086522 A1 Apr. 21, 2005

(51) Int. Cl.
*G06F 15/16* (2006.01)
*H04L 9/00* (2006.01)
*G08B 23/00* (2006.01)

(52) U.S. Cl. .................................... 726/25; 713/153
(58) Field of Classification Search ............... 726/23, 726/25; 713/153
See application file for complete search history.

(56) References Cited

U.S. PATENT DOCUMENTS

| | | | | |
|---|---|---|---|---|
| 5,727,152 | A | 3/1998 | Coolegem et al. ........... | 395/200 |
| 5,919,257 | A | 7/1999 | Trostle ........................ | 713/200 |
| 5,961,644 | A | 10/1999 | Kurtzberg et al. ........... | 713/200 |
| 5,991,881 | A | 11/1999 | Conklin et al. .............. | 713/201 |
| 6,070,244 | A | 5/2000 | Orchier et al. .............. | 713/201 |
| 6,134,664 | A | 10/2000 | Walker ........................ | 713/201 |
| 6,148,407 | A | 11/2000 | Aucsmith .................... | 713/202 |
| 6,182,223 | B1 | 1/2001 | Rawson ...................... | 713/200 |
| 6,275,942 | B1 | 8/2001 | Bernhard et al. ........... | 713/201 |
| 6,279,113 | B1 | 8/2001 | Vaidya ........................ | 713/201 |
| 6,282,546 | B1 | 8/2001 | Gleichauf et al. ........... | 707/102 |
| 6,301,668 | B1 | 10/2001 | Gleichauf et al. ........... | 713/201 |
| 6,405,318 | B1 | 6/2002 | Rowland ..................... | 713/200 |
| 6,408,391 | B1 | 6/2002 | Huff et al. ................... | 713/201 |
| 6,415,321 | B1 | 7/2002 | Gleichauf et al. ........... | 709/224 |
| 6,460,141 | B1 | 10/2002 | Olden ......................... | 713/201 |

(Continued)

FOREIGN PATENT DOCUMENTS

EP   985 995 A1   3/2000

(Continued)

OTHER PUBLICATIONS

Lee et al, Building a Tree Anomaly Detector for Intrusion Detection, 2000, IEEE, pp. 1171-1175.*
Conry-Murray, Andrew, Keep Attackers at Bay, 2005, Information Week, pp. 45-47.*
Agah et al, Intrusion Detection in Sensor Networks: A Non-cooperative Game Approach, 2004, IEEE, pp. 1-4.*
Hollingworth et al., Enhancing Operating System Resistance of Information Warfare, 2000, IEEE, pp. 1037-1041.*
"Know your Enemy: Passive Fingerprinting—Identifying remote hosts, without them knowing", Honeynet Project, http://project.honeynet.org (4 pages), Mar. 4, 2002.

(Continued)

*Primary Examiner*—Christopher A Revak
*Assistant Examiner*—Aravind K Moorthy
(74) *Attorney, Agent, or Firm*—Baker Botts L.L.P.

(57) ABSTRACT

According to one embodiment of the invention, a computerized method for reducing the false alarm rate of network intrusion detection systems includes receiving, from a network intrusion detection sensor, one or more data packets associated with an alarm indicative of a potential attack on a target host and identifying characteristics of the alarm from the data packets. The characteristics include at least an attack type and an operating system fingerprint of the target host. The method further includes identifying the operating system type from the operating system fingerprint, comparing the attack type to the operating system type, and indicating whether the target host is vulnerable to the attack based on the comparison.

21 Claims, 3 Drawing Sheets

U.S. PATENT DOCUMENTS

| | | | |
|---|---|---|---|
| 6,477,651 B1 | 11/2002 | Teal | 713/200 |
| 6,513,122 B1 | 1/2003 | Magdych et al. | 713/201 |
| 6,647,400 B1 | 11/2003 | Moran | 707/205 |
| 6,714,513 B1 | 3/2004 | Joiner et al. | 370/224 |
| 6,725,377 B1 | 4/2004 | Kouznetsov | 713/201 |
| 6,785,821 B1 | 8/2004 | Teal | 713/200 |
| 6,839,850 B1 | 1/2005 | Campbell et al. | 713/201 |
| 6,941,467 B2 | 9/2005 | Judge et al. | 713/200 |
| 6,950,845 B2 | 9/2005 | Givoly | 709/200 |
| 6,957,348 B1 | 10/2005 | Flowers et al. | 713/201 |
| 6,990,591 B1 | 1/2006 | Pearson | 713/201 |
| 7,058,968 B2 | 6/2006 | Rowland et al. | 726/1 |
| 7,073,198 B1 * | 7/2006 | Flowers et al. | 726/25 |
| 7,152,105 B2 * | 12/2006 | McClure et al. | 709/224 |
| 7,162,649 B1 | 1/2007 | Ide et al. | 713/201 |
| 7,197,762 B2 | 3/2007 | Tarquini | 726/3 |
| 7,200,866 B2 | 4/2007 | Kim et al. | 726/23 |
| 7,237,264 B1 | 6/2007 | Graham et al. | 726/23 |
| 7,444,679 B2 | 10/2008 | Tarquini et al. | 726/25 |
| 2002/0052876 A1 | 5/2002 | Waters | 707/100 |
| 2002/0087882 A1 | 7/2002 | Schneier et al. | 713/201 |
| 2003/0056116 A1 | 3/2003 | Bunker et al. | 713/201 |

FOREIGN PATENT DOCUMENTS

| | | |
|---|---|---|
| WO | WO 99/57625 | 11/1999 |
| WO | WO 00/54458 | 9/2000 |
| WO | WO 00/70464 | 11/2000 |
| WO | WO 01/84270 A2 | 11/2001 |
| WO | WO 02/19077 A2 | 3/2002 |
| WO | WO 03/084181 | 10/2003 |
| WO | WO 2005/109824 | 11/2005 |
| WO | WO 2005109824 A1 * | 11/2005 |
| WO | WO 2006/082380 | 8/2006 |
| WO | WO 2006082380 A1 * | 8/2006 |
| WO | WO 2007/122495 | 11/2007 |
| WO | WO 2007122495 A2 * | 11/2007 |

OTHER PUBLICATIONS

Toby Miller, "Passive OS Fingerprinting: Details and Techniques", The SANS Institute, http://www.incidents.org/papers/OSfingerprinting.php (19 pages), 2001-2002 (part 1) 2003 (part 2).

U.S. Appl. No. 10/402,649, filed Mar. 28, 2003, entitled *Method and System for Reducing The False Alarm Rate of Network Intrusion Detection System*, by inventors Craig Rowland and Aaron Rhodes.

U.S. Appl. No. 10/439,030, filed May 14, 2003, entitled *Method and System for Analyzing and Addressing Alarms From Network Intrusion Detection Systems*, by inventors Rowland, et al.

PCT Notification of Transmittal of the International Search Report or the Declaration, mailed Jul. 21, 2003, including International Search Report re PCT/US 03/09665 (6 pgs).

PCT Notification of Transmittal of The International Search Report and the Written Opinion of the International Searching authority, or the Declaration; Int'l Application No. PCT/US04/32976; Int'l filing date: Oct. 6, 2004; Applicant: Cisco Technology, Inc.; 12 pages, Nov. 21, 2005.

Guy G. Helmer, et al.; "*Intelligent Agents for Intrusion Detection;*" IEEE; pp. 121-124, 1998.

Ellen Messmer, "Network Intruders," Network World, p. 67-68, Oct. 4, 1999.

Dennis Hollingworth, et al., "Enhancing Operating System Resistance to Information Warfare," IEEE, pp. 1037-1041, 2000.

U.S. Appl. No. 10/402,649, filed Mar. 28, 2003 by inventor Craig H. Rowland, "Method and System for Reducing the False Alarm Rate of Network Intrusion Detection Systems".

PCT Notification of Transmittal of the International Search Report or the Declaration, mailed Sep. 16, 2003, including International Search Report re PCT/US 03/15546 (7 pgs).

Rowland, et al., U.S. Appl. No. 60/319,242 filed May 14, 2002, *A System and Method for Actively Reducing the False Alarm Rate of Network Intrusion Detection Systems*, May 14, 2002.

Rowland, et al., U.S. Appl. No. 60/319,159 filed Mar. 29, 2002, *Method and System for Reducing the False Alarm Rate of Network Intrusion Detection Systems*, Mar. 29, 2002.

Office Action from the State Intellectual Property Office of the People's Republic of China; Application No. 03807319.6, Dec. 30, 2008.

Office Action from the Canadian Intellectual Property Office; U.S. Appl. No. 2,484,461, Jan. 7, 2009.

Office Action issued by the Canadian Intellectual Property Office; U.S. Appl. No. 2,479,504; Title: Method and System for Reducing the False Alarm Rate of Network Intrusion Detection Systems, Nov. 24, 2008.

Australian Government Examiner's First Report on patent application No. 2008229835, Apr. 2, 2009.

"Keep Attackers at Bay", Andrew Conry-Murry; *Information Week*; 1046; ABI/INFORM Global; p. 45, Jul. 4, 2005.

"Building a True Anomaly Detector for Intrusion Detection", Susan C. Lee and David V. Heinbuch; The Johns Hopkins University Applied Physics Laboratory, Laurel, MD 20723, 2000.

"Intrusion Detection in Sensor Networks: A Non-cooperative Game Approach", Agah et al.; Department of Computer Science and Engineering; University of Texas at Arlington, Arlington, TX 76019-0015, 2004.

"Enhancing Operating System Resistance to Information Warfare", Dennis Hollingworth and Timothy Redmond; NAI Labs at Network Associates, Los Angeles, California, 2000.

Second Office Action issued by the Patent Office of the People's Republic of China; Applicant: Cisco Technology, Inc.; Application No. 03807319.6, Jul. 10, 2009.

Canadian Examiner's Requisition on patent application No. 2,484,461, Oct. 15, 2009.

Chinese Examiner's Office Action on patent application No. 03807319.6, Nov. 20, 2009.

* cited by examiner

METHOD AND SYSTEM FOR REDUCING THE FALSE ALARM RATE OF NETWORK INTRUSION DETECTION SYSTEMS

TECHNICAL FIELD OF THE INVENTION

This invention relates generally to intrusion detection and, more particularly, to a method and system for reducing the false alarm rate of network intrusion detection systems using offline passive analysis.

BACKGROUND OF THE INVENTION

Network Intrusion Detection Systems ("NIDS") are typically designed to monitor network activity in real-time to spot suspicious or known malicious activity and to report these findings to the appropriate personnel. By keeping watch on all activity, NIDS have the potential to warn about computer intrusions relatively quickly and allow administrators time to protect or contain intrusions, or allow the NIDS to react and stop the attack automatically. In the security industry, a NIDS may either be a passive observer of the traffic or an active network component that reacts to block attacks in real-time.

False alarms in an NIDS may be reduced by using a technique called passive operating system (OS) analysis. The typical implementation watches network traffic in real-time to discern the operating system types of the hosts by looking at the raw network packets and matching them against a known list. This method requires that the NIDS have direct access to the network traffic to work and enough processing power to handle the additional workload.

SUMMARY OF THE INVENTION

According to one embodiment of the invention, a computerized method for reducing the false alarm rate of network intrusion detection systems includes receiving, from a network intrusion detection sensor, one or more data packets associated with an alarm indicative of a potential attack on a target host and identifying characteristics of the alarm from the data packets. The characteristics include at least an attack type and an operating system fingerprint of the target host. The method further includes identifying the operating system type from the operating system fingerprint, comparing the attack type to the operating system type, and indicating whether the target host is vulnerable to the attack based on the comparison.

Some embodiments of the invention provide numerous technical advantages. Other embodiments may realize some, none, or all of these advantages. For example, according to one embodiment, the false alarm rate of network intrusion detection systems ("NIDS") is substantially reduced or eliminated, which leads to a lower requirement of personnel monitoring of NIDS to respond to every alarm. This may be facilitated by a system in which there is no need to access the network stream to determine the operating system type of the target host. The system may reside anywhere in an enterprise and may be used with different types of NIDS, even legacy NIDS sensors that do not support passive OS fingerprinting. Such a system may free up the NIDS so that it runs more efficiently and at a faster speed. In addition, an offline passive analysis system according to one embodiment facilitates the analysis of target hosts that are behind strong or impenetrable firewalls.

Other advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS OF THE INVENTION

Embodiments of the invention are best understood by referring to FIGS. 1 through 4 of the drawings, like numerals being used for like and corresponding parts of the various drawings.

Figure 1:
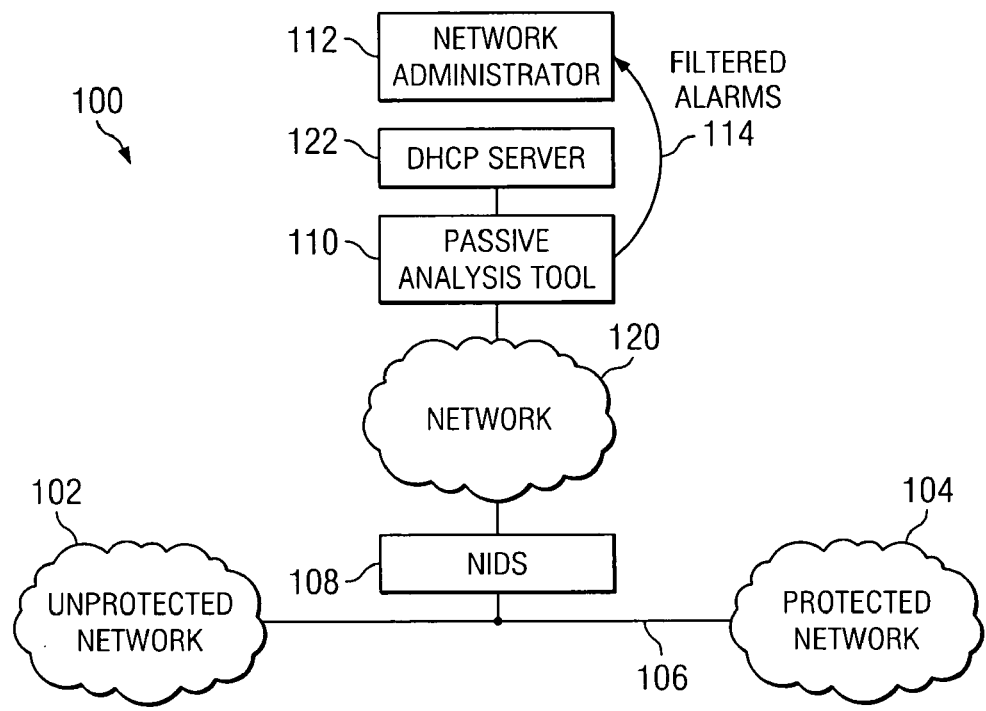
FIG. 1 is a schematic diagram illustrating a system for reducing the false alarm rate of network intrusion detection systems by utilizing an offline passive analysis according to one embodiment of the invention.

FIG. 1 is a schematic diagram illustrating a system 100 for reducing the false alarm rate of a network intrusion detection system ("NIDS") 108 by utilizing an offline passive analysis tool 110 in accordance with one embodiment of the present invention. In the illustrated embodiment, system 100 includes NIDS 108 coupled to a link 106 that communicatively couples an unprotected network 102 with a protected network 104, a network 120 that couples NIDS 108 with passive analysis tool 110, a dynamic host configuration protocol ("DHCP") server 122 coupled to passive analysis tool 110, and a network administrator 112 that utilizes passive analysis tool 110, as described in more detail below.

Unprotected network 102 may be any suitable network external to protected network 104. An example of unprotected network 102 is the Internet. Protected network 104 may be any suitable network, such as a local area network, wide area network, virtual private network, or any other suitable network desired to be secure from unprotected network 102. Link 106 couples unprotected network 102 to protected network 104 and may be any suitable communications link or channel. In one embodiment, communications link 106 is operable to transmit data in "packets" between unprotected network 102 and protected network 104; however, communications link 106 may be operable to transmit data in other suitable forms.

NIDS 108 may be any suitable network-based intrusion detection system operable to analyze data packets transmitted over communications link 106 in order to detect any potential attacks on protected network 104. NIDS 108 may be any suitable combination of hardware, firmware, and/or software. Generally, network intrusion detection systems include one or more sensors having the ability to monitor any suitable type of network having any suitable data link protocol. In addition, some network intrusion detection systems are passive observers of network traffic and do not have their own network address.

In a particular embodiment of the invention, sensors associated with NIDS 108 are operable to examine data packets on an IP ("Internet Protocol") network using any suitable protocol, such as TCP ("Transmission Controlled Protocol"), UDP ("User Datagram Protocol"), and ICMP ("Internet Controlled Message Protocol"). Upon detection of a possible attack on protected network 104, NIDS 108 is operable to generate an alarm indicating that an attack on protected network 104 may have occurred. Alarm trigger packets are then transmitted to passive analysis tool 110 over network 120 along with one or more other data packets associated with the alarm for analysis, as described in more detail below.

According to the teachings of one embodiment of the present invention, passive analysis tool 110 is a backend application that receives, via network 120, one or more data packets from NIDS 108 and, using the information associated with the data packets, determines if an attack is real or merely a false alarm. These data packets, which may be any suitable portion of an information stream, include characteristics of the alarm, such as an attack type and an operating system ("OS") fingerprint for the target host so that passive analysis tool 110 may analyze the potential attack without having access to the network stream on link 106.

In this manner, passive analysis tool 110 significantly lowers the false alarm rate for network intrusion detection systems, such as NIDS 108, in the network environment and lowers the requirement of personnel, such as network administrator 112, monitoring these systems to respond to every alarm. In addition, passive analysis tool 110 may reside anywhere in an enterprise and may be used with different types of NIDS, even legacy NIDS that do not support passive OS fingerprinting. Passive analysis tool 110 may also, in some embodiments, facilitate the analysis of target hosts that are behind strong or impenetrable firewalls.

Details of passive analysis tool 110 are described in greater detail below in conjunction with FIGS. 2 through 4. As illustrated in FIG. 1, passive analysis tool is coupled to NIDS 108 via network 120, which may be any suitable network, or combination of networks, such as a local area network, wide area network, global network, virtual private network, or any other suitable network.

Network administrator 112 may be any suitable personnel that utilizes passive analysis tool 110 in order to monitor potential attacks on protected network 104 and respond thereto, if appropriate. Network administrator 112, in one embodiment, has passive analysis tool 110 residing on his or her computer in order to receive filtered alarms from passive analysis tool, as denoted by reference numeral 114.

Figure 2:
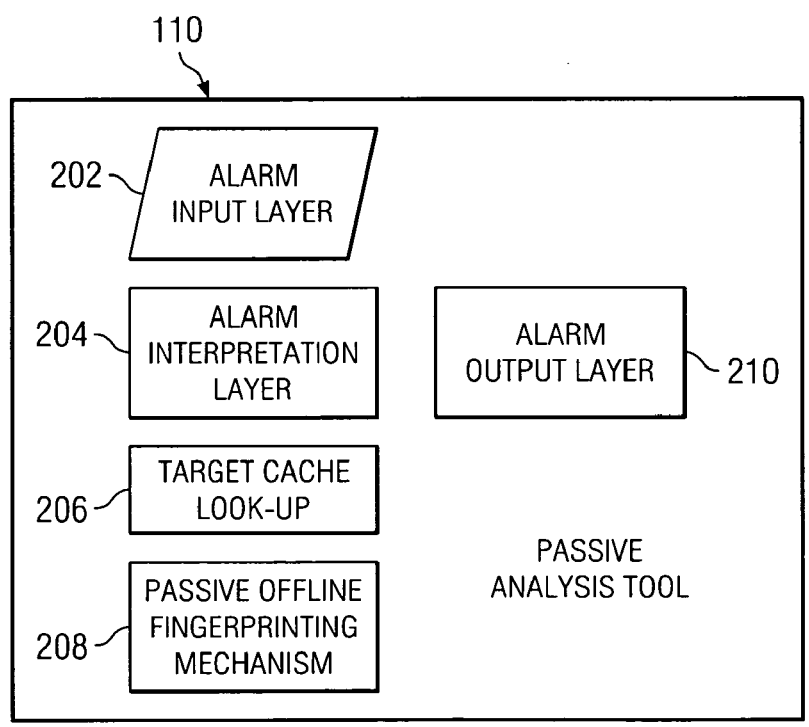
FIG. 2 is a block diagram illustrating various functional components a passive analysis tool according to the one embodiment of the invention.

FIG. 2 is a block diagram illustrating various functional components of passive analysis tool 110 in accordance with one embodiment of the present invention. The present invention contemplates more, less, or different components than those shown in FIG. 2. In the illustrated embodiment, passive analysis tool 110 includes an alarm input layer 202, an alarm interpretation layer 204, a target cache look-up 206, a passive offline fingerprinting mechanism 208, and an alarm output layer 210. The general functions of each of these components are now described before a more detailed description of the function of passive analysis tool 110 is undertaken in conjunction with FIGS. 3 and 4.

Alarm input layer 202 is generally responsible for receiving the data packets from NIDS 108 and determining if the alarm format is valid. If the alarm format is invalid, then the alarm is disregarded. If the alarm format is valid, then the alarm is sent to alarm interpretation layer 204. Alarm input layer 202 is preferably designed to be NIDS vendor independent so that it may accept alarms from multiple NIDS sources concurrently with no modification. Alarm input layer 202, in one embodiment, may also accept alarms from legacy NIDS that do not support passive OS fingerprinting.

Generally, alarm interpretation layer 204 receives the data packets from alarm input layer 202 and performs an analysis on the alarm. In one embodiment, alarm interpretation layer 204 determines whether the alarm is from a supported NIDS vendor. If the alarm is not from a supported NIDS vendor, an alert is generated and the alarm is disregarded. If the alarm is from a supported NIDS vendor, then alarm interpretation layer 204 is responsible for identifying the attack type, relevant operating system type being attacked (e.g., Microsoft Windows, Sun Solaris, Linux, UNIX, etc.), the source address, target network address, the alarm severity, the alarm description, and any other suitable parameters associated with the alarm. Some of this information is used by passive analysis 110 to test if the alarm is real or false, as described in more detail below in conjunction with FIGS. 3 and 4.

Target cache look-up 206 indicates that a look-up is performed by passive analysis tool 110 in order to determine if the target host has already been checked for the particular attack indicated by the alarm. The look-up may be performed in any suitable storage location, such as a local state table or database.

Passive offline fingerprinting mechanism 208 performs a passive analysis of the target host by identifying, from the received data packets, the operating system fingerprint of the target host, which includes the operating system type, and comparing the operating system type to the attack type. An advantage of this type of OS fingerprinting is that it requires no access to the network stream. Passive offline fingerprinting mechanism 208 may store this information in a suitable storage location for later retrieval and use.

Alarm output layer 210 is responsible for taking the analyzed data from passive analysis tool 110 and either escalating or de-escalating the alarm. In other words, alarm output layer 210 functions to report a valid alarm; i.e., that a particular target host is vulnerable to an attack. A valid alarm may be reported in any suitable manner, such as a graphical user interface, a log file, storing in a database, or any other suitable output. In one embodiment, a valid alarm is automatically reported to network administrator 112 via any suitable method.

Additional description of the details of the functions of passive analysis tool 110, according to one embodiment of the invention, are described below in conjunction with FIGS. 3 and 4.

Figure 3:
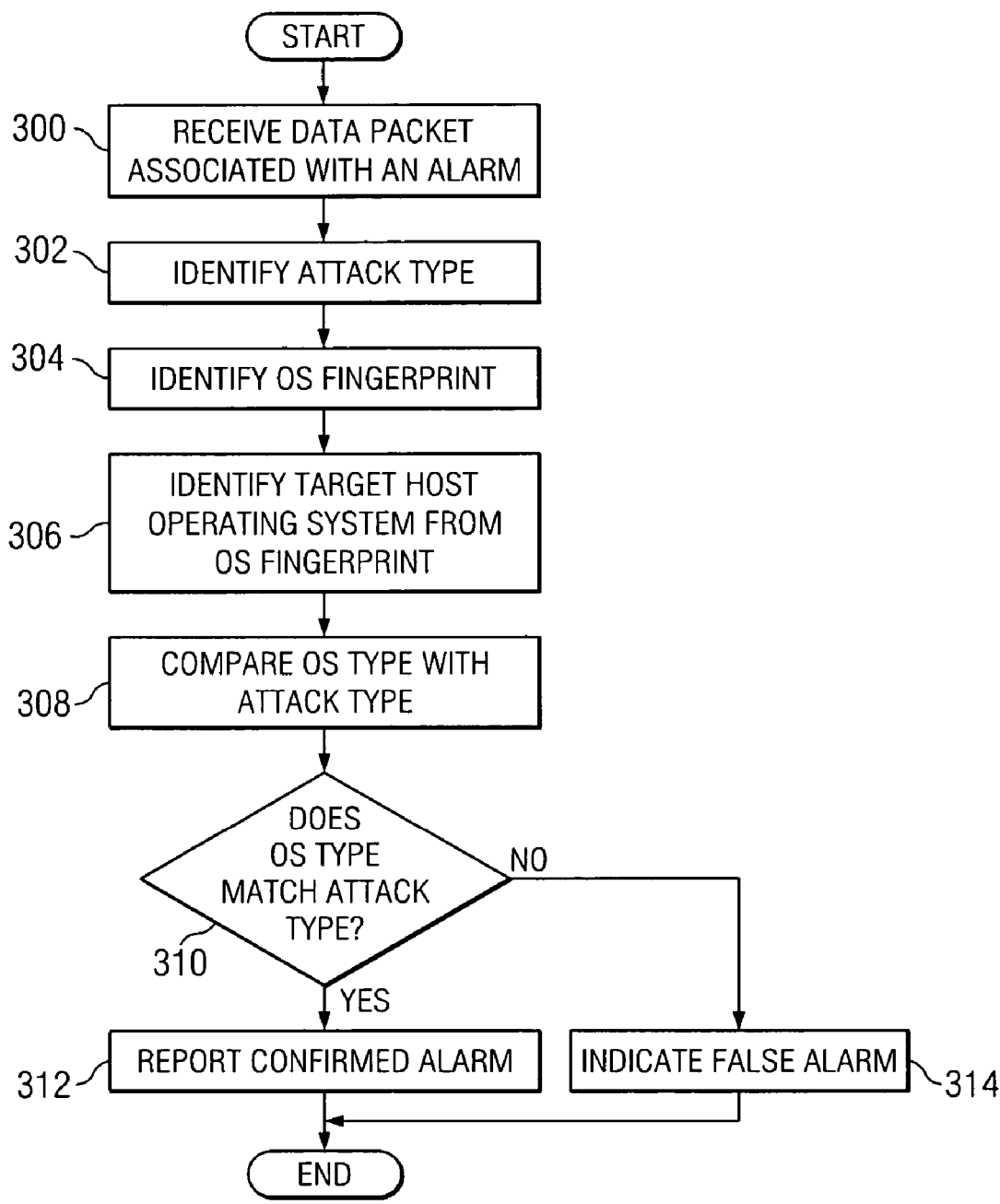
FIG. 3 is a flowchart illustrating a method for reducing the false alarm rate of network intrusion detection systems according to one embodiment of the invention.

FIG. 3 is a flow chart illustrating an example method for reducing the false alarm rate of network intrusion detection systems according to one embodiment of the present invention. The example method begins at step 300 where one or more data packets associated with an alarm is received from NIDS 108 by passive analysis tool 110. As discussed above, these data packets may be any suitable portion of an information stream and may be communicated to passive analysis tool 110 via network 120 or other suitable communication means. From the data packets, passive analysis tool 110 identifies the attack type, as denoted by step 302, and an operating system fingerprint of the target host, as denoted by step 304. The operating system type of the target host may be identified by passive analysis tool 110 from the OS fingerprint, as denoted by step 306.

The attack type and the operating system type of the target host are compared at step 308 by passive analysis tool 110. At decisional step 310, it is determined whether the operating system type of the target host matches the attack type. If there is a match, then a confirmed alarm is reported by step 312. In one embodiment, the confirmed alarm is automatically reported to network administrator 112 in any suitable manner. If there is no match, then a false alarm is indicated, as denoted by step 314. For example, if the attack type is for a Windows system and the operating system fingerprint shows a Windows host, then the alarm is confirmed. However, if the attack type is for a Windows system and the operating system fingerprint shows a UNIX host, then this indicates a false alarm. This ends the example method outlined in FIG. 3.

Although the method outlined in FIG. 3 is described with reference to passive analysis tool 110 comparing an operating system type with an attack type, other suitable characteristics of the operating system may be compared to relevant characteristics of the attack type in order to determine if the alarm is real or false. This depends on the type of information passed from NIDS 108 via the data packets.

Thus, passive analysis tool 110 is intelligent filtering technology that screens out potential false alarms while not requiring access to protected network 104. Alarm inputs are received from a deployed NIDS, such as NIDS 108, and analyzed to determine if an attack is real or a false alarm.

Figure 4:
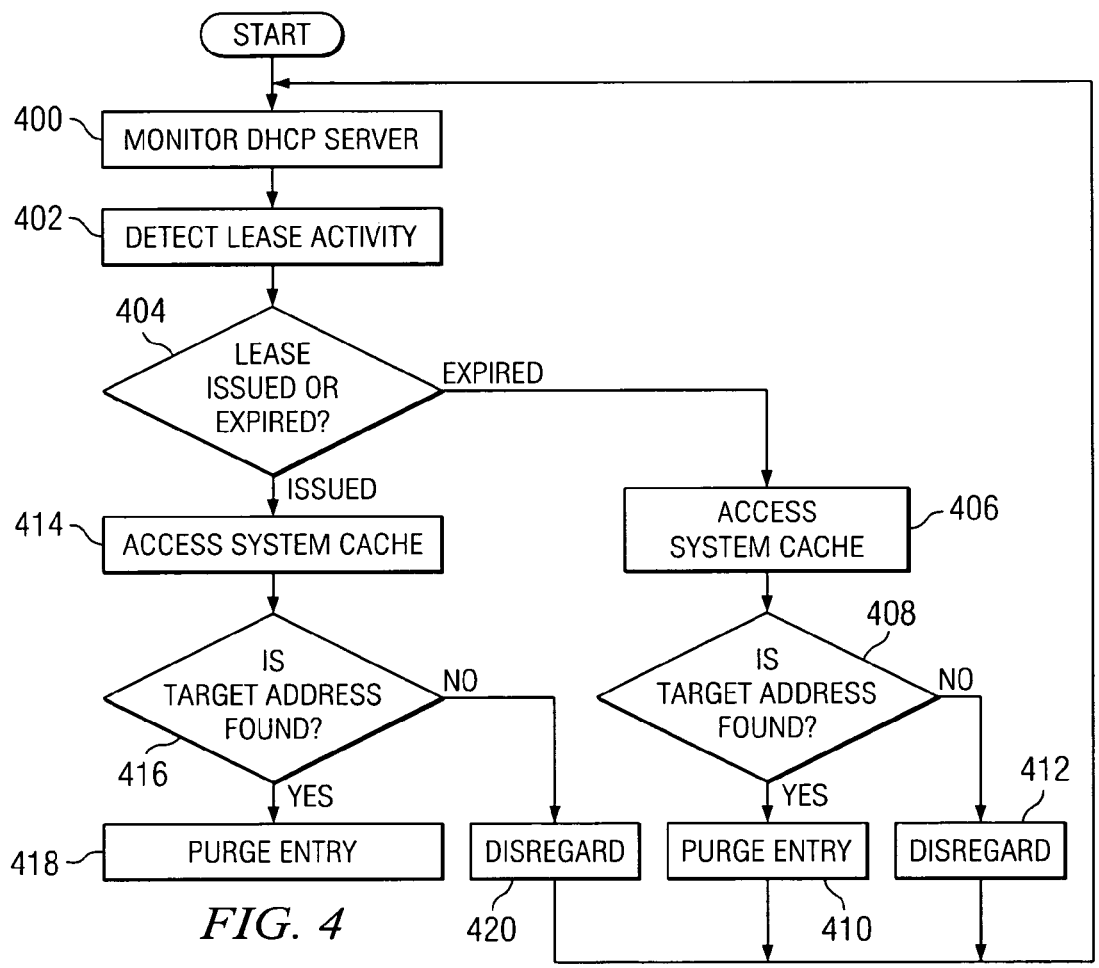
FIG. 4 is a flowchart illustrating a method that may be used in conjunction with the method of FIG. 3 according to one embodiment of the invention.

FIG. 4 is a flowchart illustrating an example method that may be used in conjunction with the example method outlined in FIG. 3 in accordance with an embodiment of the present invention. The example method in FIG. 4 begins at step 400 where DHCP server 122 (FIG. 1) is monitored by passive analysis tool 110. The present invention contemplates any suitable dynamic configuration protocol server being monitored by passive analysis tool 110. At step 402, lease activity is detected by passive analysis tool 110. At decisional step 404 it is determined whether a lease issue is detected or a lease expire is detected.

If a lease expire is detected by passive analysis tool 110, then the system cache is accessed, as denoted by step 406. At decisional step 408, it is determined whether the target address associated with the lease expire is found in the system cache. If the target address is found in the system cache, then the entry is purged, at step 410, from the system cache. Passive analysis tool 110 then continues to monitor the DHCP server. If a target address is not found in the system cache, then the lease expire is disregarded, as denoted by step 412. Passive analysis tool 110 continues to monitor the DHCP server.

Referring back to decisional step 404, if a lease issue has been detected, then the system cache is accessed, as denoted by step 414. At decisional step 416, it is determined whether the target address associated with the lease issue is found in the system cache. If the target address is found, then the entry is purged, at step 418. If the target address is not found in the system cache, then passive analysis tool 110 continues to monitor the DHCP server.

The method outlined in FIG. 4 address the dynamic addition, subtraction, or modifying of hosts in protected network 104 in order that prior knowledge of protected network 104 is not required. This saves considerable time and money and is more accurate than prior systems in which prior knowledge of the network is required. Passive analysis tool 110 may more accurately keep track of changes regarding the target hosts of protected network 104.

Although the present invention is described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A computerized method for reducing the false alarm rate of network intrusion detection systems, comprising:

receiving, from a network intrusion detection sensor, one or more data packets associated with an alarm indicative of a potential attack on a target host;

identifying characteristics of the alarm from the data packets, including at least an attack type and an operating system fingerprint of the target host;

identifying the operating system type from the operating system fingerprint;

comparing the attack type to the operating system type; and indicating whether the target host is vulnerable to the attack based on the comparison.

2. The computerized method of claim 1, further comprising storing the operating system fingerprint of the target host in a storage location for a time period.

3. The computerized method of claim 1, further comprising:

monitoring a dynamic configuration protocol server;

detecting that a lease issue has occurred for a new target host;

accessing a storage location;

determining whether an operating system fingerprint for the new target host already exists in the storage location; and if the operating system fingerprint for the new target host does exist, then purging the existing operating system fingerprint for the new target host from the storage location.

4. The computerized method of claim 1, further comprising:

monitoring a dynamic configuration protocol server;

detecting that a lease expire has occurred for an existing target host;

accessing a storage location;

determining whether an operating system fingerprint for the existing target host already exists in the storage location; and if the operating system fingerprint for the existing target host does not exist, then disregarding the lease expire; and if the operating system fingerprint for the existing target host does exist, then purging the existing operating system fingerprint for the existing target host from the storage location.

5. The computerized method of claim 1, further comprising:

after receiving the data packets, determining whether a format for the alarm is valid; and if the format is not valid, then disregarding the alarm; otherwise if the format is valid, then continuing the computerized method with the identifying characteristics step.

6. The computerized method of claim 1, further comprising automatically alerting a network administrator if the target host is vulnerable to the attack.

7. A system for reducing the false alarm rate of network intrusion detection systems, comprising:

a network intrusion detection system operable to transmit one or more data packets associated with an alarm indicative of a potential attack on a target host;

a software program embodied in a computer readable medium, the software program, when executed by a processor, operable to:

receive the one or more data packets;

identify characteristics of the alarm from the data packets, including at least an attack type and an operating system fingerprint of the target host;

identify the operating system type from the operating system fingerprint;
compare the attack type to the operating system type; and
indicate whether the target host is vulnerable to the attack based on the comparison.

8. The system of claim 7, further comprising a storage location operable to store the operating system fingerprint of the target host for a time period.

9. The system of claim 8, wherein the software program is further operable to:
monitor a dynamic configuration protocol server;
detect that a lease issue has occurred for a new target host;
access a storage location;
determine whether an operating system fingerprint for the new target host already exists in the storage location; and
if the operating system fingerprint for the new target host does exist, then the software program is further operable to purge the existing operating system fingerprint for the new target host from the storage location.

10. The system of claim 8, wherein the software program is further operable to:
monitor a dynamic configuration protocol server;
detect that a lease expire has occurred for an existing target host;
access a storage location;
determine whether an operating system fingerprint for the existing target host already exists in the storage location; and
if the operating system fingerprint for the existing target host does not exist, then disregard the lease expire; and
if the operating system fingerprint for the existing target host does exist, then purge the existing operating system fingerprint for the existing target host from the storage location.

11. The system of claim 8, wherein the software program is further operable to automatically alert a network administrator of the attack if the target host is vulnerable to the attack.

12. The system of claim 8, wherein the software program has no knowledge of the protected network architecture.

13. The system of claim 8, wherein the software program has no access to the protected network.

14. The system of claim 8, wherein the NIDS is vendor independent.

15. The system of claim 8, wherein the NIDS does not support passive operating system fingerprinting.

16. A system for reducing the false alarm rate of network intrusion detection systems, comprising:
means for receiving, from a network intrusion detection sensor, one or more data packets associated with an alarm indicative of a potential attack on a target host;
means for identifying characteristics of the alarm from the data packets, including at least an attack type and an operating system fingerprint of the target host;
means for identifying the operating system type from the operating system fingerprint;
means for comparing the attack type to the operating system type; and
means for indicating whether the target host is vulnerable to the attack based on the comparison.

17. The system of claim 16, further comprising means for storing the operating system fingerprint of the target host for a time period.

18. The system of claim 16, further comprising:
means for monitoring a dynamic configuration protocol server;
means for detecting that a lease issue has occurred for a new target host;
means for accessing a storage location;
means for determining whether an operating system fingerprint for the new target host already exists in the storage location; and
if the operating system fingerprint for the new target host does exist, then means for purging the existing operating system fingerprint for the new target host from the storage location.

19. The system of claim 16, further comprising:
means for monitoring a dynamic configuration protocol server;
means for detecting that a lease expire has occurred for an existing target host;
means for accessing a storage location;
means for determining whether an operating system fingerprint for the existing target host already exists in the storage location; and
if the operating system fingerprint for the existing target host does not exist, then means for disregarding the lease expire; and
if the operating system fingerprint for the existing target host does exist, then means for purging the existing operating system fingerprint for the existing target host from the storage location.

20. The system of claim 16, further comprising:
after receiving the data packets, means for determining whether a format for the alarm is valid; and
if the format is not valid, then means for disregarding the alarm.

21. The system of claim 16, further comprising means for automatically alerting a network administrator if the target host is vulnerable to the attack.

* * * * *